(12) United States Patent
Nojima et al.

(10) Patent No.: US 12,730,120 B2
(45) Date of Patent: Sep. 8, 2026

(54) METHOD FOR WASHING DISPENSING PROBE INCLUDED IN AUTOMATED ANALYZER, AND AUTOMATED ANALYZER

(71) Applicant: HITACHI HIGH-TECH CORPORATION, Tokyo (JP)

(72) Inventors: Akihiro Nojima, Tokyo (JP); Yosuke Horie, Tokyo (JP); Masaaki Hirano, Tokyo (JP); Eiichiro Takada, Tokyo (JP); Yuka Miyake, Tokyo (JP); Takamichi Mori, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 724 days.

(21) Appl. No.: 18/000,540

(22) PCT Filed: Feb. 5, 2021

(86) PCT No.: PCT/JP2021/004332

§ 371 (c)(1),
(2) Date: Dec. 2, 2022

(87) PCT Pub. No.: WO2021/260993

PCT Pub. Date: Dec. 30, 2021

(65) Prior Publication Data

US 2024/0230700 A1 Jul. 11, 2024

(30) Foreign Application Priority Data

Jun. 23, 2020 (JP) ................................ 2020-107691

(51) Int. Cl.
*G01N 35/10* (2006.01)
*G01N 35/02* (2006.01)

(52) U.S. Cl.
CPC ....... *G01N 35/1004* (2013.01); *G01N 35/025* (2013.01); *G01N 35/1067* (2013.01)

(58) Field of Classification Search
CPC ............. G01N 35/1004; G01N 35/025; G01N 35/1067

(Continued)

(56) References Cited

U.S. PATENT DOCUMENTS

2004/0265185 A1 12/2004 Kitagawa
2010/0151578 A1 6/2010 Ravalico et al.

(Continued)

FOREIGN PATENT DOCUMENTS

JP 2003-294773 A 10/2003
JP 2004-325117 A 11/2004

(Continued)

OTHER PUBLICATIONS

Takayama, Hiroko , English Machine Translation of JP 2013-148516, abstract, description and claims, obtained from https://worldwide.espacenet.com on Jun. 24, 2021 . (Year: 2021).*

(Continued)

*Primary Examiner* — Christine T Mui
(74) *Attorney, Agent, or Firm* — Baker Botts L.L.P.

(57) ABSTRACT

An object of the invention is to provide a technique capable of enhancing a cleaning effect of a dispensing probe while preventing an influence on an analysis throughput. In a method according to the invention, an inner surface of a dispensing probe is cleaned by repeating an inner surface liquid-feeding period in which a cleaning liquid is fed to an inside of the dispensing probe and an inner surface stop period in which the cleaning liquid is not fed.

20 Claims, 8 Drawing Sheets

(58) Field of Classification Search
USPC ...................................................... 422/67, 50
See application file for complete search history.

(56) References Cited

U.S. PATENT DOCUMENTS

| | | | | |
|---|---|---|---|---|
| 2014/0186234 | A1* | 7/2014 | Maruyama ......... | G01N 35/1004 422/510 |
| 2020/0225256 | A1 | 7/2020 | Fukaya et al. | |

FOREIGN PATENT DOCUMENTS

| | | | | |
|---|---|---|---|---|
| JP | 2005-003610 | A | 1/2005 | |
| JP | 2005-241442 | A | 9/2005 | |
| JP | 2010-085097 | A | 4/2010 | |
| JP | 2011-513737 | A | 4/2011 | |
| JP | 2013-148516 | A1 * | 8/2013 | ............. G01N 35/10 |
| JP | 2016-003967 | A | 1/2016 | |
| WO | WO 2009/111343 | A1 | 9/2009 | |
| WO | WO 2018/055928 | A1 | 3/2018 | |

OTHER PUBLICATIONS

International Search Report, mailed Apr. 20, 2021, for International Application No. PCT/JP2021/004332.
Extended European Search Report, mailed Jun. 7, 2024, for European Application No. 21828706.8.

* cited by examiner

METHOD FOR WASHING DISPENSING PROBE INCLUDED IN AUTOMATED ANALYZER, AND AUTOMATED ANALYZER

TECHNICAL FIELD

The present invention relates to a method for cleaning a dispensing probe included in an automatic analysis device configured to dispense a liquid.

BACKGROUND ART

Clinical chemical analysis is a process of analyzing components such as inorganic ions, proteins, urea, sugars, lipids, enzymes, hormones, drugs, tumor markers, etc. in a biological sample such as blood or urine. Automatic analysis devices are widely used in the clinical chemical analysis. In general, an automatic analysis device employs a hollow dispensing probe to dispense the sample or a reagent for reacting with the sample. Except for a device using a disposable tip, a sample dispensing probe and a reagent dispensing probe are cleaned by a cleaning mechanism and repeatedly used.

As a method for cleaning an inner surface of the dispensing probe, a method of feeding a cleaning liquid (for example, pure water or an aqueous solution of a surfactant) into the hollow interior of the dispensing probe through a cleaning mechanism has been known. In the case of cleaning the outer surface of the dispensing probe, there is known a method of spraying the cleaning liquid onto the outer surface of the dispensing probe to clean.

PTL 1 specified below describes a technique for cleaning a dispensing head. The same literature discloses a technique for cleaning both the outer peripheral portion and the inside of the dispensing nozzle.

CITATION LIST

Patent Literature

PTL 1: JP 2004-325117 A

SUMMARY OF INVENTION

Technical Problem

When the conventional cleaning method is used, it is necessary to extend the cleaning time in order to improve the cleaning effect in cleaning the inner surface of the dispensing probe. Therefore, in order to increase the cleaning effect, the influence on the analysis throughput is inevitable. On the other hand, in order to improve the analysis throughput, it is necessary to reduce the cleaning time. However, when the cleaning time and the amount of cleaning liquid are reduced, a sufficient cleaning effect cannot be obtained.

The present invention has been made in view of the above problems, and an object of the present invention is to provide a technique enabling improvement of a cleaning effect of a dispensing probe while suppressing an influence on an analysis throughput.

Solution to Problem

The method according to the present invention cleans an inner surface of the dispensing probe by repeating an inner surface liquid-feeding period in which a cleaning liquid is fed to an inside of the dispensing probe and an inner surface stop period in which the cleaning liquid is not fed.

Advantageous Effects of Invention

According to the method of the present invention, it is possible to obtain a cleaning effect equal to or higher than that of the conventional technique while suppressing the influence on the analysis throughput, with a smaller amount of the cleaning liquid than the conventional technique.

DESCRIPTION OF EMBODIMENTS

First Embodiment

Figure 1:
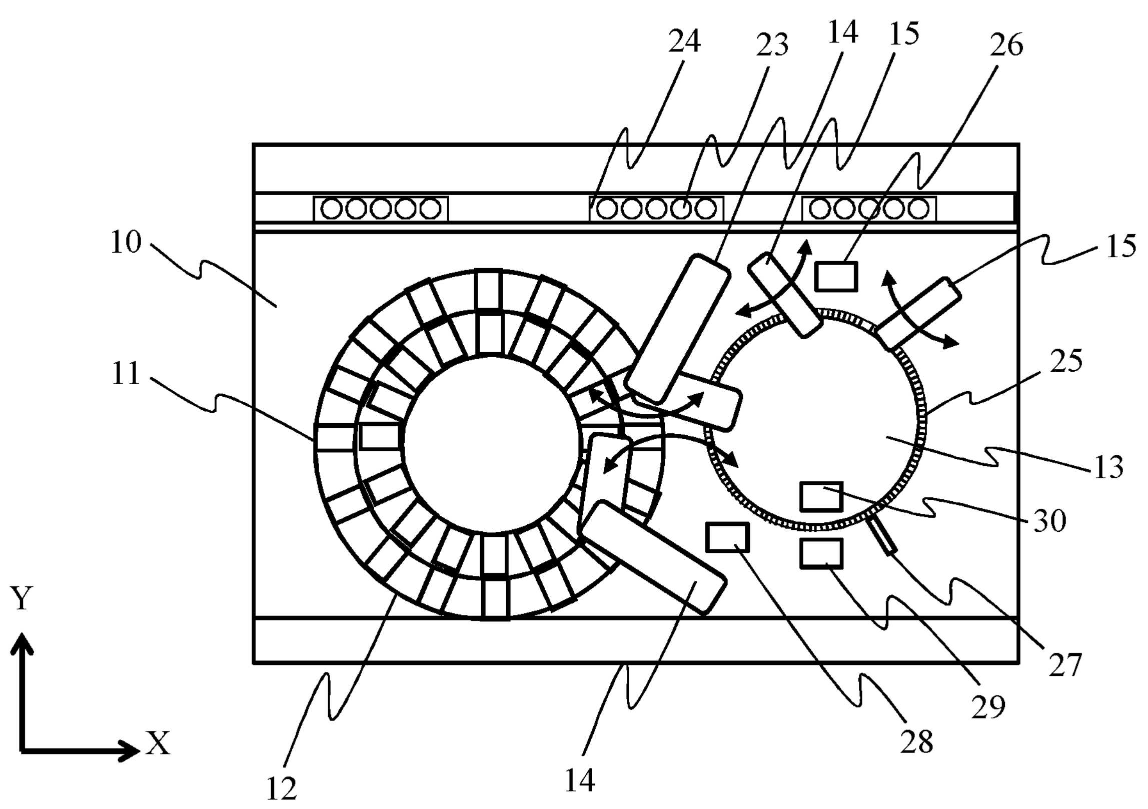
FIG. 1 is a configuration diagram of an automatic analysis device 10 according to a first embodiment.

FIG. 1 is a configuration diagram of an automatic analysis device 10 according to the first embodiment of the present invention. The automatic analysis device 10 includes: a reagent disk 12 on which a plurality of reagent containers 11 are mounted; a reaction disk 13 mounted with a cell 25 for mixing a reagent and a sample and measuring a reaction: a reagent dispensing mechanism 14 that suctions and discharges the reagent: a sample dispensing mechanism 15 that suctions and discharges the sample.

The reagent dispensing mechanism 14 includes a reagent dispensing probe 21 (see FIG. 2) for dispensing the reagent, and the sample dispensing mechanism 15 includes a sample dispensing probe 22 (not illustrated) for dispensing the sample. The sample put into the device is mounted on a rack 24 and conveyed in a state of being contained in a sample container 23. A plurality of sample containers 23 are mounted on the rack 24. The sample is a sample derived from blood such as serum or whole blood, urine, or the like.

The sample dispensing mechanism 15 moves the sample dispensing probe 22 by a rotation operation to (a) a suction position at which the sample is suctioned from the sample container 23, (b) a discharge position at which the sample is discharged to the cell 25, and (c) a cleaning position at which the tip of the sample dispensing probe 22 is cleaned by a cleaning tank 26, respectively. Further, the sample dispensing mechanism 15 lowers the sample dispensing probe 22 in accordance with the height of each of the sample container 23, the cell 25, and the cleaning tank 26 at the suction position, the discharge position, and the cleaning position, respectively.

Similarly, the reagent dispensing mechanism 14 moves the reagent dispensing probe 21 to (a) a suction position at which the reagent is suctioned from the reagent container 11, (b) a discharge position at which the reagent is discharged to the cell 25, and (c) a cleaning position at which the tip of the reagent dispensing probe 21 is cleaned in the cleaning tank 28. Further, the reagent dispensing mechanism 14 lowers the reagent dispensing probe 21 in accordance with the height of each of the reagent container 11, the cell 25, and the cleaning tank 28 at the suction position, the discharge position, and the cleaning position, respectively.

The sample dispensing probe 22 and the reagent dispensing probe 21 each include a sensor (for example, a sensor using a change in capacitance or pressure) that detects a liquid level, and contact thereof with a target liquid (sample or reagent) can be confirmed from a sensor signal. In cleaning of the dispensing probe, since the contact range with the target liquid is limited, the amount of cleaning water can be reduced, and thus the range in which the dispensing probe is immersed into the target liquid is generally controlled. The limitation of the immersion range produces also an effect of suppressing variation in dispensing.

The automatic analysis device 10 analyzes the concentration of a predetermined component in the sample and the like by the following procedure, for example. First, the sample container 23 conveyed by the rack 24 moves to the sample suction position. Next, the sample dispensing probe 22 is rotated to the sample suction position by the sample dispensing mechanism 15 to suction the sample from the sample container 23. Thereafter, the sample is rotationally moved while being held in the sample dispensing probe 22, and then is discharged into the cell 25. Thereafter, the sample dispensing probe 22 is rotationally moved to the cleaning tank 26 by the sample dispensing mechanism 15, and then is cleaned. Next, the cell 25 is rotated by the reaction disk 13, and then is moved to the discharge position of the reagent dispensing probe 21. The reagent container 11 is moved to the suction position of the reagent dispensing probe 21 by the reagent disk 12. Thereafter, the reagent dispensing probe 21 is moved by the reagent dispensing mechanism 14 to the suction position where the reagent container 11 is positioned, and suctions the reagent from the reagent container 11. The reagent dispensing probe 21 is moved to the discharge position by the reagent dispensing mechanism 14 while holding the reagent, and discharges the reagent to the cell 25 from which the sample has already been discharged. The cell 25 from which the sample and the reagent have been discharged is rotated by the reaction disk 13, and the stirring mechanism 27 is moved to a stirring position where the solution in the cell 25 can be stirred. The mixed liquid of the sample and the reagent in the cell 25 is stirred by the stirring mechanism 27, whereby the reaction between the sample and the reagent in the cell 25 is promoted. The reaction liquid between the sample and the reagent is subjected to photometry using a light source 29 and a photometer 30, whereby the concentration of a predetermined component in the sample and the like can be analyzed.

In the above procedure, each device operation has been sequentially described; however, since each mechanism can operate independently, it is possible to reduce the total operation period by performing the operations in parallel. Therefore, usually, the analysis throughput defined as the number of tests that can be processed per unit time by the automatic analysis device 10 is determined by the period of the most time-consuming process among the processes.

In other words, the number of tests that can be performed per unit time by the automatic analysis device 10 is determined by any one of the following: (a) in the case of sample dispensing by the sample dispensing probe 22, the time from when the sample dispensing probe 22 starts suctioning the sample to perform analysis until the sample dispensing probe 22 starts suctioning the sample to analyze the next sample or to analyze another item of the same sample: and (b) in the case of reagent dispensing by the reagent dispensing probe 21, the time from when the reagent dispensing probe 21 starts suctioning a reagent to perform analysis until the reagent dispensing probe 21 starts suctioning the reagent to perform analysis using the next reagent or to perform analysis on a different sample using the same reagent. The above (a) and (b) are referred to as cycle time. The cycle time may vary depending on an analysis target item or the like. Here, the shortest cycle time among the cycle times of a specific individual automatic analysis device 10 is referred to as the shortest cycle time in the specific automatic analysis device 10.

When dispensing is performed in the shortest cycle time, the time that can be used to clean the inner surface of the dispensing probe is calculated by subtracting the time required for the movement, suction, and discharge of the dispensing probe from the shortest cycle time, and is usually shorter than the time required for the movement, suction, and discharge of the dispensing probe, and is often 2 seconds or less, and typically about 1 second or less.

Figure 2:
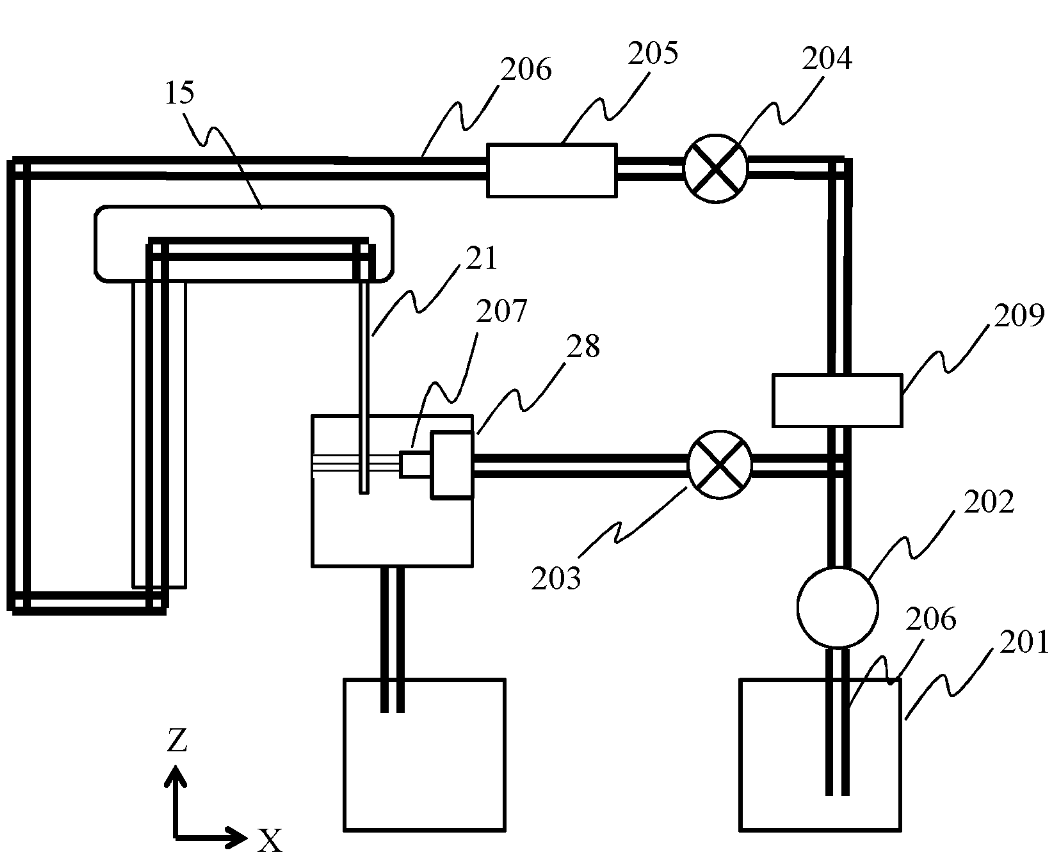
FIG. 2 shows a configuration example of a flow path for cleaning a sample dispensing probe 22 or a reagent dispensing probe 21.

FIG. 2 shows a configuration example of a flow path for cleaning a sample dispensing probe 22 or a reagent dispensing probe 21. The cleaning liquid is supplied from a cleaning liquid tank 201. The cleaning liquid is pumped up by a pump 202 from the cleaning liquid tank 201 through a tube 206. Ahead of the pump 202, an electromagnetic valve 203 for cleaning the outer surface of the dispensing probe (hereinafter, may be referred to as exterior cleaning), a pump 209, and a syringe pump 205 for cleaning the interior surface of the dispensing probe (hereinafter, may be referred to as interior cleaning) are installed. Ahead of the electromagnetic valve 203, the cleaning tank 28 is installed, and when the electromagnetic valve 203 is opened, the cleaning liquid pumped up by the pump 202 is sprayed onto the outer surface of the dispensing probe through the cleaning nozzle 207 of the cleaning tank 28. Ahead of the electromagnetic valve 204, a syringe pump 205 is connected. Ahead of the syringe pump 205, the reagent dispensing probe 21 is connected. When the electromagnetic valve 204 is opened, the cleaning liquid is pumped up from the cleaning liquid tank 201 by the pump 202 and the pump 209 through the syringe pump 205 and the tube 206, and then is supplied to the reagent dispensing probe 21, whereby the inner surface of the dispensing probe is cleaned.

The cleaning effect was evaluated using the flow channel configuration of FIG. 2. The cleaning effect was evaluated by the following procedure. Hereinafter, the reagent dispensing probe 21 is described as an example, but the sample dispensing probe 22 can also be evaluated by a similar method.

First, a solution containing a simulated reagent component is suctioned and discharged by the reagent dispensing probe 21. In the case of using the automatic analysis device 10 in FIG. 1, a solution containing a simulated reagent component is put in one of the reagent containers 11, and the solution is suctioned by the reagent dispensing probe 21 and discharged to one of the cells 25. Next, the reagent dispensing probe 21 is cleaned in the cleaning tank 28. Thereafter, the reagent disk 12 is rotated, and the solution not containing the simulated reagent component is suctioned by the reagent dispensing probe 21 from the reagent container 11 different from the reagent container 11 containing the solution containing the simulated reagent component. At this time, the solution not containing the simulated reagent component or the reagent component may be pure water, physiological saline or the like, or a solution containing a surfactant or the like. After suctioning the solution not containing the simulated reagent component, the reaction disk 13 was rotated, and the solution not containing the simulated reagent component was discharged to the cell 25 different from the cell to which the solution containing the simulated reagent component was discharged. The cleaning effect was evaluated by quantitatively analyzing the amount of a trace amount of the simulated reagent component eluted in the solution thus discharged to the cell. It is considered that the cleaning effect is higher when the amount of the simulated reagent component carried into the solution not containing the simulated reagent component is smaller.

Figure 3:
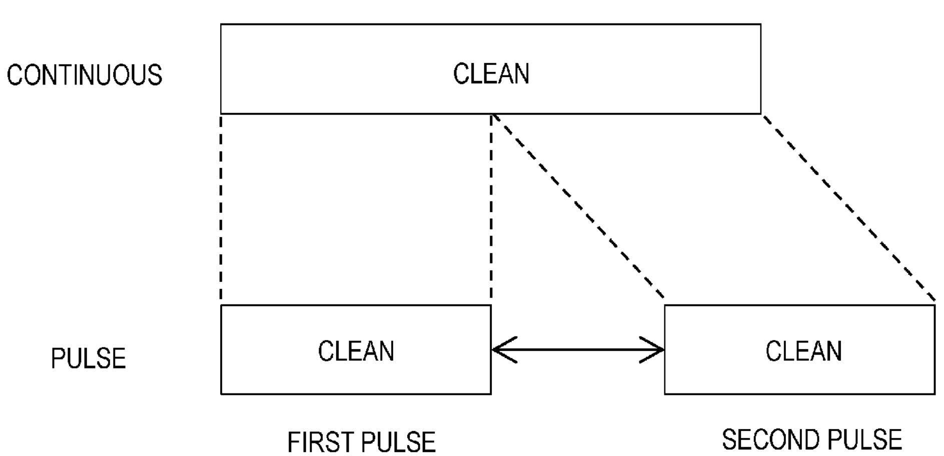
FIG. 3 is a time chart of a cleaning operation used in an evaluation.

FIG. 3 is a time chart of a cleaning operation used in an evaluation. A time chart of the normal cleaning operation is shown in the upper part of FIG. 3, and a time chart of the cleaning operation considered in the present embodiment is shown in the lower part of FIG. 3. In the time chart of the normal cleaning operation shown in the upper part of FIG. 3, cleaning is performed by continuously feeding a cleaning liquid to the inner surface of the dispensing probe. Specifically, in order to perform this operation, for example, when the flow path configuration of FIG. 2 is used, the electromagnetic valve 204 is opened to feed the cleaning liquid, and the electromagnetic valve 204 is closed at the end of the cleaning. At this time, a period during which cleaning is continuously performed is shorter than the shortest cycle time of the device, for example, about 1 second or less.

In the time chart of the cleaning operation shown in the lower part of FIG. 3, after the electromagnetic valve 204 is opened, cleaning is performed for a certain period of time, and the electromagnetic valve 204 is closed. Subsequently, the feeding of the cleaning liquid is stopped for a certain period of time. Thereafter, the electromagnetic valve 204 is opened again, and after cleaning is performed for a certain period of time, the electromagnetic valve 204 is closed. Such a cleaning method in which cleaning is performed by feeding the cleaning liquid while providing a certain stop time is referred to herein as pulse cleaning. In the pulse cleaning, a period during which the cleaning liquid is continuously fed (a period from when the feeding of the cleaning solution is started to when the feeding of the cleaning solution is stopped) is referred to as a pulse.

The pulse cleaning includes one or more pulses, and the pulse is referred to as a first pulse, a second pulse, and the like in the order from the earliest one. The total cleaning time of the pulses is shorter than the shortest cycle time of the automatic analysis device 10, for example, about 1 second or less, as in the case of continuously feeding the cleaning liquid described above. In addition, the time from the start of the first cleaning pulse to the end of the last cleaning pulse is similarly shorter than the shortest cycle time, and is, for example, about 1 second or less to about 2 seconds.

Figure 4:
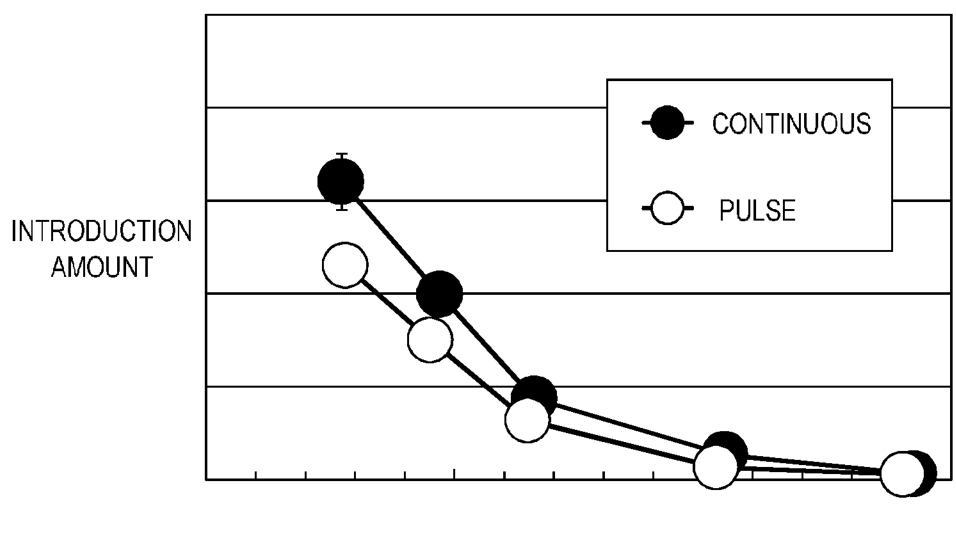
FIG. 4 shows a result of comparing and analyzing a cleaning effect of continuous cleaning at an upper part of FIG. 3, in which a cleaning liquid is continuously fed for about 1 second for the cleaning, and a cleaning effect of pulse cleaning in which the cleaning is intermittently performed as shown in a lower part of FIG. 3.

FIG. 4 shows a result of comparing and analyzing a cleaning effect of continuous cleaning at an upper part of FIG. 3, in which a cleaning liquid is continuously fed for about 1 second for the cleaning, and a cleaning effect of pulse cleaning in which the cleaning is intermittently performed as shown in a lower part of FIG. 3. The amount of the simulated reagent component carried into the solution not containing the simulated reagent component is shown on the vertical axis, and the amount of the cleaning liquid used in the cleaning is shown on the horizontal axis. Through comparison between the cases using the same amount of the cleaning liquid, it can be seen that the pulse cleaning has a higher cleaning effect.

The higher cleaning effect with the same amount of cleaning liquid obtained through suspending the feeding of the cleaning liquid is considered to be due to the following factors. Typically, when cleaning is performed by continuously feeding the cleaning liquid, a portion with a high flow rate near the center of a hollow portion of the dispensing probe can be efficiently cleaned along the velocity field of the cleaning liquid. On the other hand, near the wall of the hollow portion of the dispensing probe, the flow rate is relatively low, and the cleaning cannot be efficiently performed by the effect of the velocity field of the cleaning liquid. Therefore, after the simulated reagent component has diffused to the vicinity of the center of the hollow portion of the dispensing probe with the high flow rate of the cleaning liquid, the simulated reagent component is cleaned along the velocity field of the cleaning solution being fed. When the feeding of the cleaning liquid is suspended, the cleaning by the velocity field of the cleaning liquid is not performed, but since the cleaning liquid exists in the hollow portion, the diffusion of the simulated reagent component continues. Therefore, when the feeding of the cleaning liquid is suspended, the simulated reagent component is diffused into the central portion of the hollow portion of the dispensing probe. As a result, when cleaning is performed with the second pulse, the simulated reagent component diffused into the central portion is efficiently cleaned along the velocity field of the cleaning liquid.

Second Embodiment

In the second embodiment of the present invention, the influence of the time period of suspending the cleaning on the cleaning effect was examined. Only the time period of suspending the cleaning (time interval between pulses) was changed without changing the lengths of the first pulse and the second pulse, and the cleaning effect was evaluated. The evaluation method is as in the first embodiment. A solution containing a simulated reagent component is suctioned by the reagent dispensing probe 21 and discharged to the cell 25. Next, in the cleaning tank 28, cleaning was performed using the time chart of the pulse cleaning operation in the lower part of FIG. 3. Thereafter, the solution not containing the simulated reagent component is suctioned, and then is discharged to the cell 25 different from the cell to which the solution containing the simulated reagent component was discharged. The cleaning effect was evaluated by quantitatively analyzing the amount of the simulated reagent component contained in the solution discharged to the cell 25. The configuration of the automatic analysis device 10 is same as that of the first embodiment.

Figure 5:
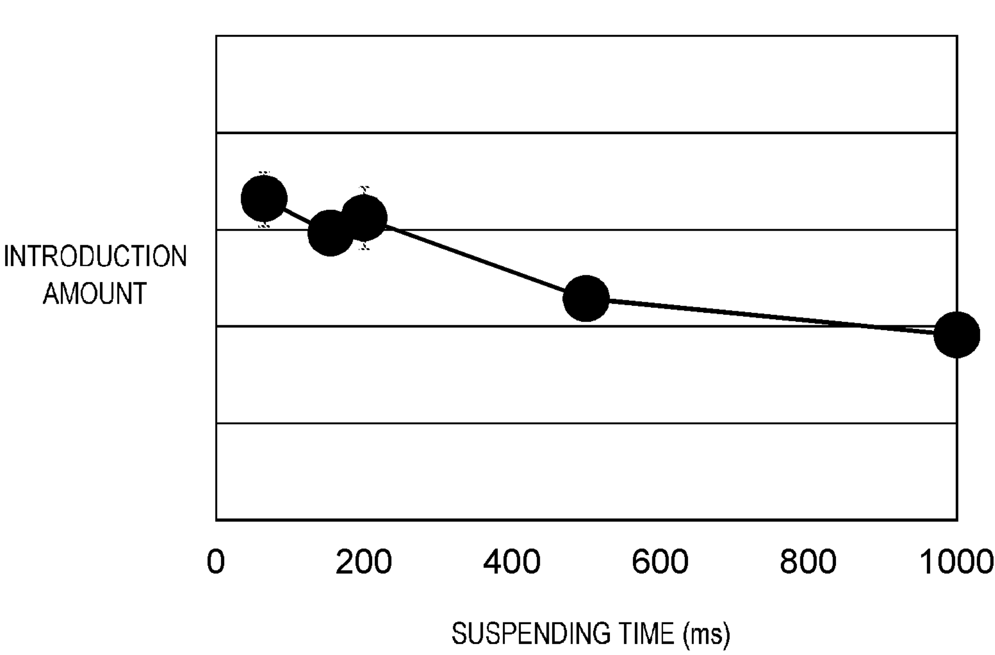
FIG. 5 shows a result of measuring a change in an amount of an introduced simulated reagent component while changing a time for suspending the cleaning.

FIG. 5 shows a result of measuring a change in an amount of an introduced simulated reagent component while changing a time period for suspending the cleaning. The vertical axis represents the carry-in amount, and the horizontal axis represents the time period of suspending the cleaning. As a result, it can be seen that the carry-in amount monotonously decreases as the cleaning suspension period increases. Therefore, in order to produce the higher cleaning effect with the same amount of cleaning liquid, it is desirable to provide the suspension period of the cleaning as long as possible.

However, in light of operation of the automatic analysis device 10, it is necessary to clean the dispensing probe within a limited time. For example, a case of the cleaning with two pulses of the first pulse and the second pulse is considered. Assuming that the cleaning time is T1, the necessary amount of the cleaning liquid is W, and the flow rate of the cleaning liquid is V, the time T2 for suspending the cleaning can be determined by the following equation: $T2=T1-W/V$.

The result that the cleaning effect is higher when the cleaning suspension period is longer is considered to be consistent with the mechanism assumed in the first embodiment that the effect of the pulse cleaning is due to the diffusion of the simulated reagent component when the cleaning is suspended. That is, it is considered that the longer the washing suspension period was, the longer the diffusion distance of the simulated reagent component became, and a greater amount of the simulated reagent component was diffused into a portion where the flow rate of the cleaning liquid was great in the central portion of the hollow portion of the reagent dispensing probe 21 before the washing of the second pulse was performed.

Third Embodiment

In the first and second embodiments, pulse cleaning in which cleaning was divided into 2 sessions was mainly considered. In the third embodiment of the present invention, the relationship between the number of pulse divisions or the length of pulse period and the cleaning effect was examined in more detail. The configuration of the automatic analysis device 10 is same as that of the first embodiment.

Figure 6:
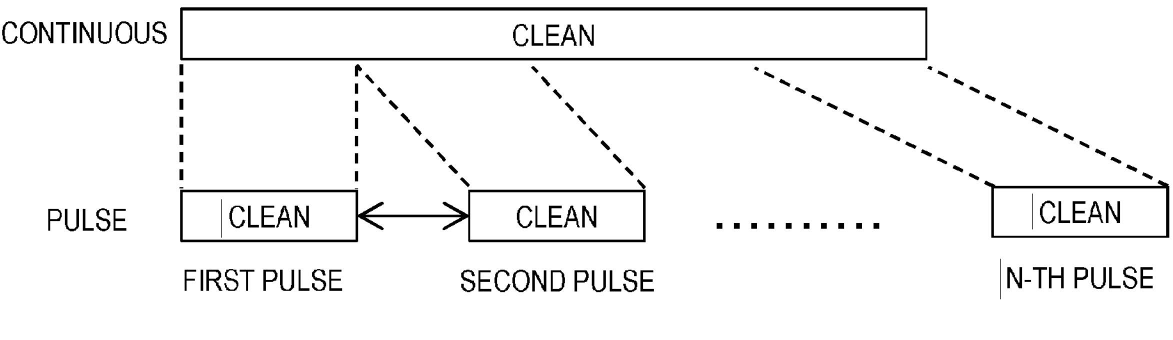
FIG. 6 is a time chart of a cleaning operation used in the evaluation.

FIG. 6 is a time chart of a cleaning operation used in the evaluation. First, about 40% of the cleaning time was performed by the first pulse and the remaining cleaning time was divided into two to seven portions, and the cleaning effect was examined in each of the cases.

Figure 7:
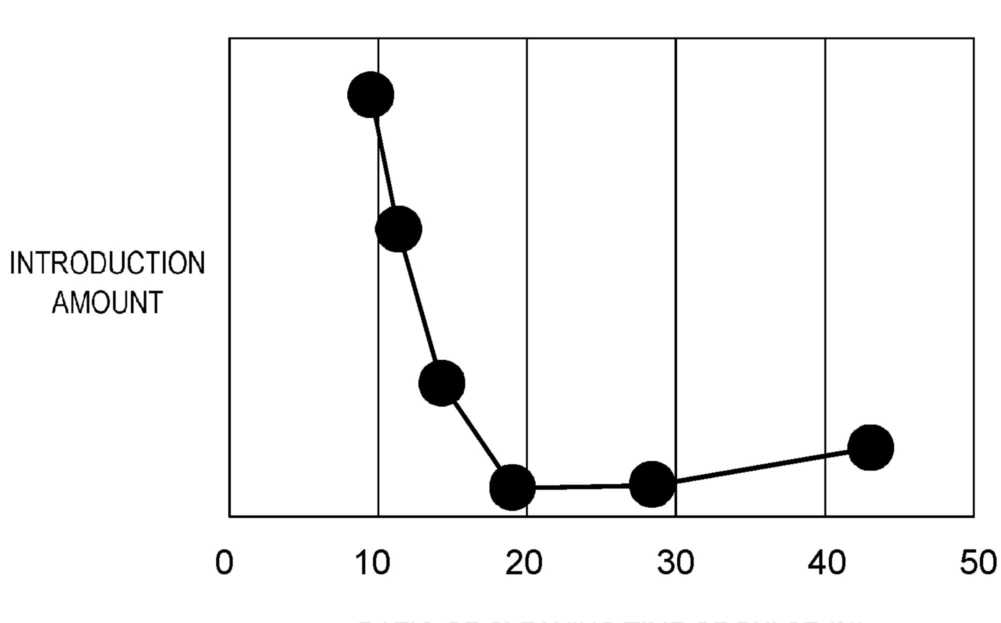
FIG. 7 shows a result of evaluating a cleaning time of each pulse.

FIG. 7 shows a result of evaluating a cleaning time of each pulse. It can be seen that when the proportion of the cleaning time of each pulse was 20 to 60% of the total cleaning time (sum of all pulse cleaning times), the cleaning effect does not change significantly. However, when the cleaning time is less than 20%, the cleaning effect rapidly decreases. This result is considered to be due to the fact that a certain period of time is required to stabilize the flow of the cleaning liquid, and the cleaning effect could not be sufficiently obtained in a case where liquid feeding was not performed for about 20% or more of the cleaning time. In the case where the cleaning time of each pulse was 20% or 30%, a higher cleaning effect was obtained than in the case where the cleaning time was 60%.

From the above results, it can be seen that the cleaning time of each pulse is desirably 20% or more of the total cleaning time. In other words, the number of pulse divisions including the first pulse is desirably 2 or more and 4 or less. This is because when the number of divisions is 5 or more, any of the pulses becomes 20% or less of the cleaning time. In addition, in view of the fact that the higher cleaning effect was obtained when the cleaning time was around 30%, the number of divisions including the first pulse is desirably 3 or more.

Fourth Embodiment

In the fourth embodiment of the present invention, a case where the dispensing probe outer surface is cleaned in parallel with cleaning of the dispensing probe inner surface is described. We evaluated the relationship of the relative timing between the inner surface cleaning and the outer surface cleaning. The configuration of the automatic analysis device 10 is same as that of the first embodiment.

As an evaluation method, similarly to the method described in the first embodiment, the solution containing a simulated reagent component is suctioned by the reagent dispensing probe 21 and then is discharged to the cell 25. Thereafter, cleaning is performed in the cleaning tank 28. Thereafter, a solution not containing the simulated reagent component is dispensed, is discharged to the cell 25, and then is washed in the cleaning tank 28. The cleaned state at this time was observed while evaluating a plurality of timing conditions of the outer surface cleaning and the inner surface cleaning.

As a result of the evaluation, it was confirmed that when the inner surface cleaning was started prior to the outer surface cleaning, there was a case where the liquid feeding state of the cleaning solution from the inner surface was unstable. Before cleaning the inner surface of the reagent dispensing probe 21, a part of the simulated reagent component and the component of the solution not containing the simulated reagent component remains on the inner surface, and these components and the cleaning liquid are mixed at the start of cleaning. At this time, when the solution remaining on the inner surface of the reagent dispensing probe 21 and the cleaning liquid were mixed, the two liquids had different liquid properties, and thus there was a case where the flow of the cleaning liquid was unstable due to foaming or the like caused by a surfactant effect.

On the other hand, the present inventors have found that, in a case where the outer surface cleaning preceded the inner surface cleaning, when the cleaning was started in a state where the cleaning liquid on the inner surface covered the probe tip, even if the flow state of the cleaning liquid on the inner surface was disturbed, the cleaning solution sprayed onto the outer surface could prevent the influence thereof. This was considered to be due to, when the mixed liquid of the cleaning liquid on the inner surface and the residual component of the simulated reagent component spilled from the inner surface of the reagent dispensing probe 21, the mixed liquid being taken into the cleaning liquid sprayed onto the outer surface and moving along the flow field of the cleaning liquid sprayed onto the outer surface.

Figure 8A:
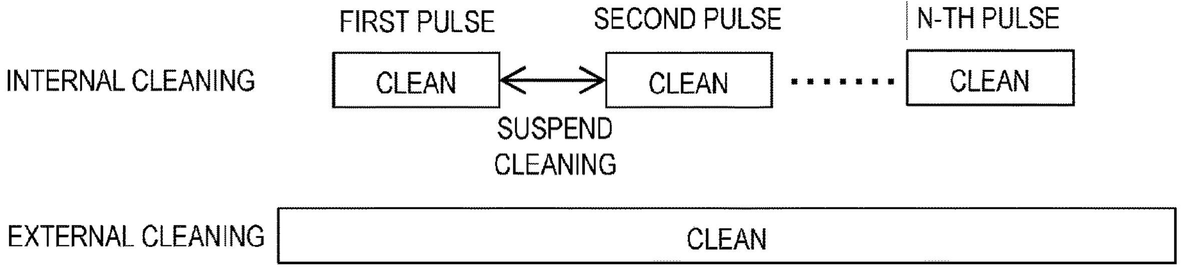
FIG. 8A is a time chart of the cleaning operation including an external cleaning operation.

FIG. 8A is a time chart of the cleaning operation including the exterior cleaning operation configured in view of the above evaluation results. In FIG. 8A, the outer surface cleaning is started before the inner surface cleaning is started. However, when this time chart of the cleaning operation is employed, it is necessary to perform the exterior cleaning longer than the time during which the interior cleaning is performed, in other words, than the total time of the suspension period and the pulse cleaning, and the consumption amount of the cleaning liquid increases.

Given this, in order to further reduce the amount of cleaning liquid used for the exterior cleaning, the timing of stopping the spray of the cleaning liquid onto the outer surface in a state of feeding the cleaning liquid on the inner surface of the reagent dispensing probe 21 was considered. As a result, it has been clarified that there was no particular problem even if the spraying of the cleaning liquid onto the outer surface was stopped in a state where the cleaning of the inner surface was continued, as long as a certain period of time (for example, about 50 ms) elapsed after the cleaning of the inner surface was once started. The reason for this is considered to be as follows.

When a certain period of time elapses after the start of the cleaning of the inner surface, the proportion of the simulated reagent component or the like in the cleaning liquid fed to the inner surface of the reagent dispensing probe 21 decreases and the solution coming out from the inner surface is only the cleaning liquid, whereby the liquid property is uniformized. Therefore, it is considered that foaming due to the surfactant effect or the like as described above is not observed, and the liquid feeding state is stabilized. As a result, even when the cleaning liquid was not sprayed onto the outer surface, a problem such as scattering of the cleaning liquid did not occur.

Figure 8B:
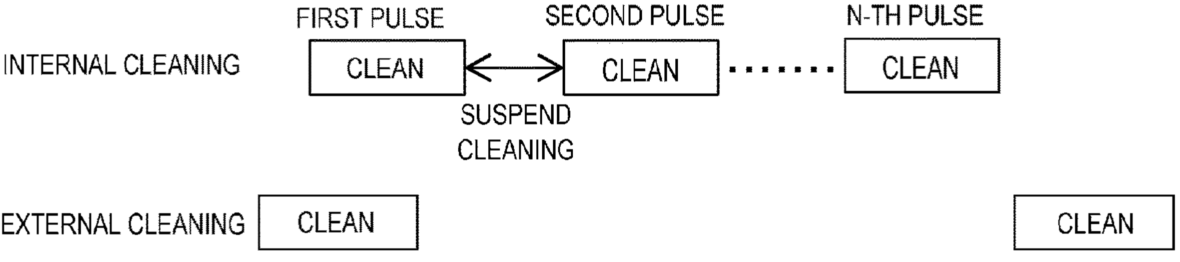
FIG. 8B is a time chart of the cleaning operation including the external cleaning operation.

FIG. 8B is a time chart of the cleaning operation including the exterior cleaning operation configured in view of the above evaluation results. The cleaning of the inner surface is pulsed as in the first embodiment. As a result, the higher cleaning effect can be obtained as compared with a case of typical continuous cleaning of the inner surface. Finally, it has been found that the cleaning liquid attached to the tip of the reagent dispensing probe 21 (particularly, the end surface portion of the tip) can be removed by cleaning the outer surface after completion of the cleaning of the inner surface. This can prevent the cleaning liquid component from being brought into the next reagent. Therefore, it has been found that the amount of cleaning liquid used for exterior cleaning can be reduced by the time chart shown in FIG. 8B.

Figure 9A:
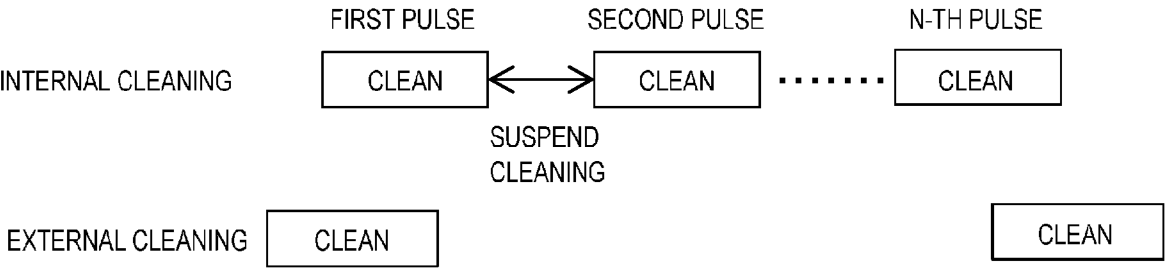
FIG. 9A is a modification of a time chart of the cleaning operation including the external cleaning operation.

FIG. 9A is a modification of a time chart of the cleaning operation including the exterior cleaning operation. In FIG. 8B, the last outer surface cleaning pulse is started after completion of the inner surface cleaning. In order to further shorten the cleaning time as compared with FIG. 8B, the last outer surface cleaning pulse is started while the last inner surface cleaning pulse is being performed, and the outer surface cleaning is completed after completion of the inner surface cleaning, as illustrated in FIG. 9A.

Figure 9B:
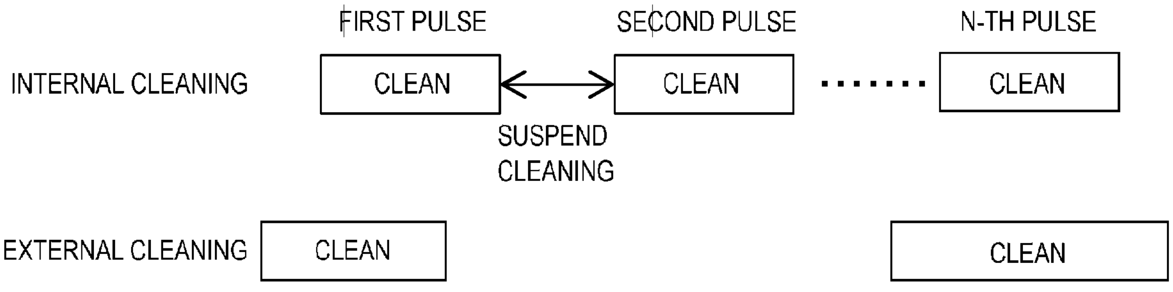
FIG. 9B is a modification of a time chart of the cleaning operation including the external cleaning operation.

FIG. 9B is a modification of a time chart of the cleaning operation including the external cleaning operation. In the interval period between the second to last inner surface cleaning pulse and the last inner surface cleaning pulse, the last outer surface cleaning pulse is started and the outer surface cleaning is completed after completion of the inner surface cleaning. This cleaning operation also enables further reduction of the cleaning time as compared with FIG. 8B.

Fifth Embodiment

In the first to fourth embodiments, the pump 202 and the pump 209 were used in combination as a cleaning pump for cleaning the inner surface of the dispensing probe. Cleaning was started by opening the electromagnetic valve 204, and cleaning was stopped by closing the electromagnetic valve 204. The flow rate is thus determined by the pressure of these pumps. Typically, such cleaning is performed at a relatively high flow rate. On the other hand, we separately prepared a pump with a lower flow rate, and attempted to perform finishing cleaning by driving the pump. This was intended to improve the cleaning effect by performing pulse cleaning at a relatively high pressure and a high flow rate and then performing cleaning at a low flow rate. The other configurations of the automatic analysis device 10 were same as those of the first embodiment.

Figure 10:
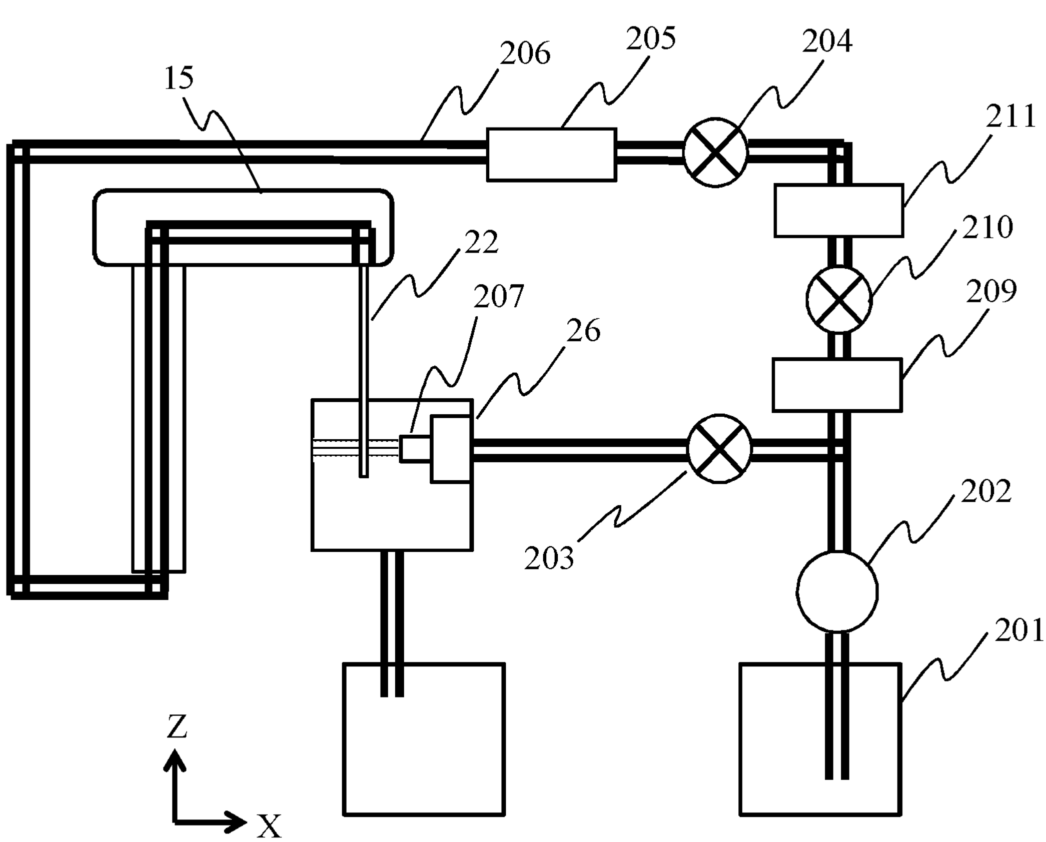
FIG. 10 shows a flow path configuration according to a fifth embodiment.

FIG. 10 shows a flow path configuration according to the present fifth embodiment. In addition to the configuration described in FIG. 2, a pump 210 of a low flow rate is added.

Figure 11:
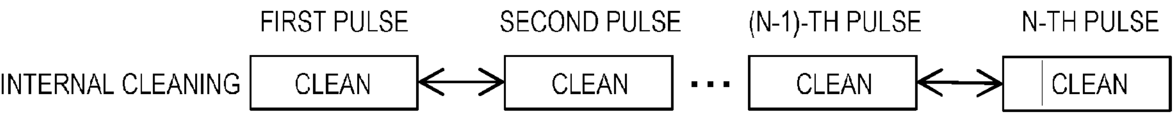
FIG. 11 is time chart of the cleaning operation used in an evaluation according to the fifth embodiment.
Figure 11:
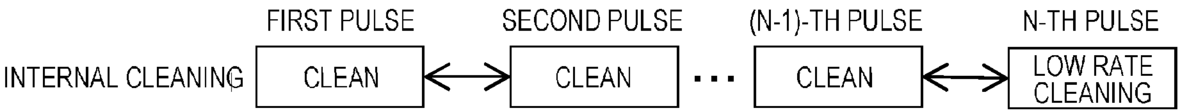

FIG. 11 shows a time chart of the cleaning operation used in an evaluation according to the present fifth embodiment. The pulse cleaning was performed with the pump 202 and the pump 209 of a large flow rate, and then cleaning was performed with the pump 210 of a low flow rate. The evaluation was performed in the same manner as in the first embodiment. In other words, the solution containing the simulated reagent component is suctioned and then is discharged to the cell 25 by the reagent dispensing probe 21. Thereafter, cleaning was performed according to the configuration of FIG. 10 and the time chart of FIG. 11. Thereafter, the solution not containing the simulated reagent component was suctioned and then is discharged to 25 cells, and the carry-in amount of the simulated reagent component contained in the solution discharged to the cells 25 was evaluated.

Figure 12:
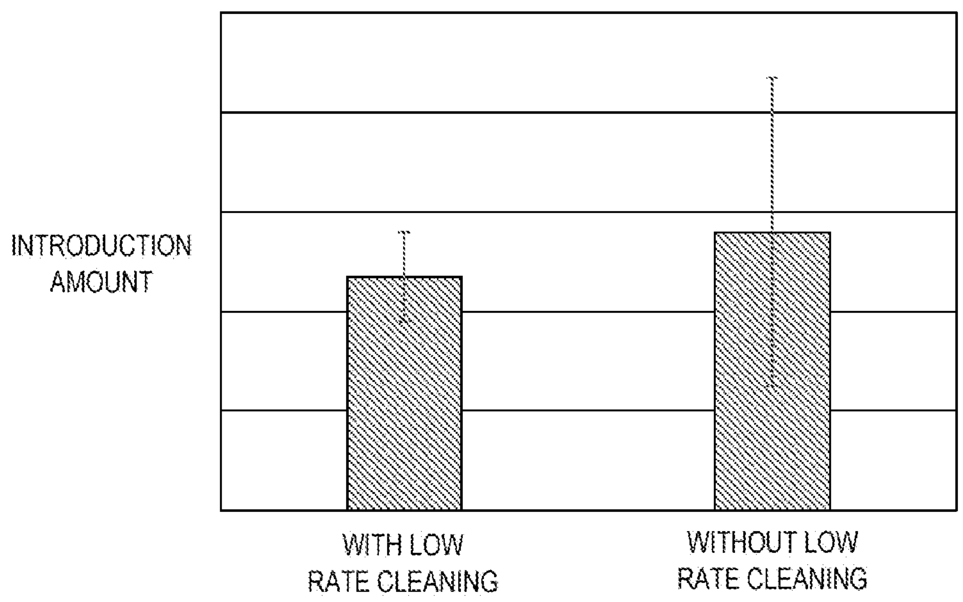
FIG. 12 shows an evaluation result according to the fifth embodiment.

FIG. 12 shows an evaluation result according to the present fifth embodiment. As for the carry-in amount, the amount obtained by adding cleaning with the pump 202 of a low flow rate is slightly lower than the case of cleaning with only the pump 209 and the pump 210 of a large flow rate, but a significant difference is not observed. On the other hand, a significant difference was observed regarding the variation in the carry-in amount. It can be seen that, in the case where the cleaning by the pump 210 of a low flow rate was added, the variation in the carry-in amount was reduced as compared with the case where such cleaning was not added, and the cleaning effect was further stabilized. As described above, by performing the cleaning using pumps of different flow rates, the cleaning effect can be stabilized.

<Regarding Modifications of the Present Invention>

The present invention is not limited to the above-described embodiments, and encompasses various modifications. For example, the above-described embodiments have been described in detail for the sake of comprehensible explanation of the present invention, and are not necessarily limited to those provided with all the described configurations. Furthermore, a part of the configuration of one embodiment can be replaced with the configuration of another embodiment, and the configuration of another embodiment can be added to the configuration of one embodiment. In addition, with regard to a part of the configuration of each embodiment, addition of other configurations, deletion, and replacement are possible.

In the above embodiments, each functional unit (the reagent dispensing mechanism 14, the reagent disk 12, the reaction disk 13, the electromagnetic valve, the pump, and the like) included in the automatic analysis device 10 can be controlled by a controller provided in the automatic analysis device 10. The controller can be configured by hardware such as a circuit device in which such a function is implemented, or can be configured by an arithmetic device executing software in which the function is implemented.

In the above embodiments, the cleaning of the reagent dispensing probe 21 has been mainly described; however, the present invention is not limited thereto, and the present invention can also be applied to other dispensing probes such as the sample dispensing probe 22.

REFERENCE SIGN LIST

10 automatic analysis device
11 reagent container
12 reagent disk
13 reaction disk
14 reagent dispensing mechanism
15 sample dispensing mechanism
21 reagent dispensing probe
22 sample dispensing probe
23 sample container
24 rack
25 cell
26 cleaning tank
27 stirring mechanism
28 cleaning tank
29 light source
30 photometer
201 cleaning liquid tank
202 pump
203 electromagnetic valve
204 electromagnetic valve
205 syringe pump
206 tube
207 cleaning nozzle
209 pump
210 pump

The invention claimed is:

1. A method for cleaning a dispensing probe included in an automatic analysis device configured to dispense a liquid, the method comprising:

cleaning an inner surface of the dispensing probe, wherein the cleaning of the inner surface includes performing an inner surface liquid-feeding period in which a cleaning liquid is fed to an inside of the dispensing probe and an inner surface stop period in which the cleaning liquid is not fed, and performing the inner surface liquid-feeding period again after the inner surface stop period, the inner surface stop period is configured to be a maximum value under a condition that a sum of the inner surface liquid-feeding periods, a number of the inner surface liquid-feeding periods, and a sum of an inner surface liquid feeding periods and the inner surface stop periods are certain defined values, respectively, and while a last inner surface liquid-feeding period in the cleaning of the inner surface is performed, cleaning an outer surface of the dispensing probe includes starting a last outer surface liquid-feeding period, and subsequent to the last inner surface liquid-feeding period being completed, the cleaning of the outer surface includes completing the last outer surface liquid-feeding period.

2. A method for cleaning a dispensing probe included in an automatic analysis device configured to dispense a liquid, the method comprising:

cleaning an inner surface of the dispensing probe, wherein the cleaning of the inner surface includes cleaning the inner surface by repeating an inner surface liquid-feeding period in which a cleaning liquid is fed to an inside of the dispensing probe and an inner surface stop period in which the cleaning liquid is not fed, the cleaning of the inner surface includes performing the inner surface liquid-feeding period twice or more, wherein lengths of at least two of the inner surface liquid-feeding periods are different from each other, each of the inner surface stop periods is 25% or more of a sum of the inner surface liquid-feeding periods and the inner surface stop periods, and while a last inner surface liquid-feeding period in the cleaning of the inner surface is performed, cleaning an outer surface of the dispensing probe includes starting a last outer surface liquid-feeding period, and subsequent to the last inner surface liquid-feeding period being completed, the cleaning of the outer surface includes completing the last outer surface liquid-feeding period.

3. The method according to claim 2, wherein in the cleaning the inner surface, a time length of each of the inner surface liquid-feeding periods is 20% or more of a sum of time lengths of all the inner surface liquid-feeding periods.

4. The method according to claim 3, further comprising:

cleaning an outer surface of the dispensing probe, wherein the cleaning the inner surface includes performing the inner surface liquid-feeding period three times or more, and a first surface liquid-feeding period is longest.

5. A method for cleaning a dispensing probe included in an automatic analysis device configured to dispense a liquid, the method comprising:

cleaning an inner surface of the dispensing probe, wherein the cleaning of the inner surface includes cleaning the inner surface by repeating an inner surface liquid-feeding period in which a cleaning liquid is fed to an inside of the dispensing probe and an inner surface stop period in which the cleaning liquid is not fed, the method further comprises cleaning an outer surface of the dispensing probe, the method initiates the cleaning of the outer surface before initiating the cleaning of the inner surface, the cleaning of the outer surface includes one or more outer surface liquid-feeding periods in which a cleaning liquid is fed to the outer surface of the dispensing probe, and one or more outer surface stop periods in which the cleaning liquid is not fed, while a last inner surface liquid-feeding period in the cleaning of the inner surface is performed, a cleaning an outer surface of the dispensing probe includes starting a last outer surface liquid-feeding period, and subsequent to the last inner surface liquid-feeding period being completed, the cleaning of the outer surface includes completing the last outer surface liquid-feeding period.

6. A method for cleaning a dispensing probe included in an automatic analysis device configured to dispense a liquid, the method comprising cleaning an inner surface of the dispensing probe, wherein the cleaning of the inner surface includes cleaning the inner surface by repeating an inner surface liquid-feeding period in which a cleaning liquid is fed to an inside of the dispensing probe and an inner surface stop period in which the cleaning liquid is not fed, the method further comprises cleaning an outer surface of the dispensing probe, the method initiates the cleaning of the outer surface before initiating the cleaning of the inner surface, the cleaning of the outer surface includes one or more outer surface liquid-feeding periods in which a cleaning liquid is fed to the outer surface of the dispensing probe, and one or more outer surface stop periods in which the cleaning liquid is not fed, while a last inner surface liquid-feeding period in the cleaning of the inner surface is performed:

the cleaning of the outer surface includes starting a last outer surface liquid-feeding period, and subsequent to the last inner surface liquid-feeding period being completed:

the cleaning of the outer surface includes completing the last outer surface liquid-feeding period.

7. A method for cleaning a dispensing probe included in an automatic analysis device configured to dispense a liquid, the method comprising cleaning an inner surface of the dispensing probe, wherein the cleaning of the inner surface includes cleaning the inner surface by repeating an inner surface liquid-feeding period in which a cleaning liquid is fed to an inside of the dispensing probe and an inner surface stop period in which the cleaning liquid is not fed, the method further comprises cleaning an outer surface of the dispensing probe, the method initiates the cleaning of the outer surface before initiating the cleaning of the inner surface, the cleaning of the outer surface includes one or more outer surface liquid-feeding periods in which a cleaning liquid is fed to the outer surface of the dispensing probe, and one or more outer surface stop periods in which the cleaning liquid is not fed, while a last one of the inner surface liquid-feeding period in the cleaning of the inner surface is performed:

the cleaning of the outer surface includes starting a last one of the outer surface liquid-feeding period, and subsequent to the last one of the inner surface liquid-feeding period being completed:

the cleaning of the outer surface includes completing the last one of the outer surface liquid-feeding period.

8. A method for cleaning a dispensing probe included in an automatic analysis device configured to dispense a liquid, the method comprising cleaning an inner surface of the dispensing probe, wherein the cleaning of the inner surface includes cleaning the inner surface by repeating an inner surface liquid-feeding period in which a cleaning liquid is fed to an inside of the dispensing probe and an inner surface stop period in which the cleaning liquid is not fed, the cleaning of the inner surface includes feeding the cleaning liquid at a first flow rate from a first one of the inner surface liquid-feeding period to a second-to-last one of the inner surface liquid-feeding period, and the cleaning of the inner surface includes feeding the cleaning liquid at a second flow rate lower than the first flow rate in a last inner surface liquid-feeding period, while the last inner surface liquid-feeding period in the cleaning of the inner surface is performed, a cleaning an outer surface includes starting a last outer surface liquid-feeding period, and subsequent to the last inner surface liquid-feeding period being completed, the cleaning of the outer surface includes completing the last outer surface liquid-feeding period.

9. The method according to claim 1, wherein a total time length of the inner surface liquid-feeding period for cleaning the inner surface of the dispensing probe is 1 second or less.

10. The method according to claim 1, wherein:

a total time length of the inner surface liquid-feeding period is 1 second or less;

a total time length of the inner surface stop period is 1 second or less; or a total time period comprising the inner surface liquid-feeding period and the inner surface stop period for cleaning the inner surface of the dispensing probe is 1 second or less.

11. The method according to claim 2, wherein a total time length of the inner surface liquid-feeding period for cleaning the inner surface of the dispensing probe is 1 second or less.

12. The method according to claim 2, wherein:

a total time length of the inner surface liquid-feeding period is 1 second or less;

a total time length of the inner surface stop period is 1 second or less; or a total time period comprising the inner liquid-feeding period and the inner surface stop period for cleaning the inner surface of the dispensing probe is 1 second or less.

13. The method according to claim 5, wherein a total time length of the inner surface liquid-feeding period for cleaning the inner surface of the dispensing probe is 1 second or less.

14. The method according to claim 5, wherein:

a total time length of the inner surface liquid-feeding period is 1 second or less;

a total time length of the inner surface stop period is 1 second or less; or a total time period comprising the inner surface liquid-feeding period and the inner surface stop period for cleaning the inner surface of the dispensing probe is 1 second or less.

15. The method according to claim 6, wherein a total time length of the inner surface liquid-feeding period for cleaning the inner surface of the dispensing probe is 1 second or less.

16. The method according to claim 6, wherein:

a total time length of the inner surface liquid-feeding period is 1 second or less;

a total time length of the inner surface stop period is 1 second or less; or a total time period comprising the inner surface liquid-feeding period and the inner surface stop period for cleaning the inner surface of the dispensing probe is 1 second or less.

17. The method according to claim 7, wherein a total time length of the inner surface liquid-feeding period for cleaning the inner surface of the dispensing probe is 1 second or less.

18. The method according to claim 7, wherein:

a total time length of the inner surface liquid-feeding period is 1 second or less;

a total time length of the inner surface stop period is 1 second or less; or a total time period comprising the inner surface liquid-feeding period and the inner surface stop period for cleaning the inner surface of the dispensing probe is 1 second or less.

19. The method according to claim 8, wherein a total time length of the inner surface liquid-feeding period for cleaning the inner surface of the dispensing probe is 1 second or less.

20. The method according to claim 8, wherein:

a total time length of the inner surface liquid-feeding period is 1 second or less;

a total time length of the inner surface stop period is 1 second or less; or a total time period comprising the inner surface liquid-feeding period and the inner surface stop period for cleaning the inner surface of the dispensing probe is 1 second or less.

* * * * *